(12) United States Patent
Suzuki et al.

(10) Patent No.: US 11,840,456 B2
(45) Date of Patent: Dec. 12, 2023

(54) RARE EARTH COMPOUND PARTICLES AND METHOD FOR PRODUCING RARE EARTH OXIDE PARTICLES

(71) Applicant: Shin-Etsu Chemical Co., Ltd., Tokyo (JP)

(72) Inventors: Hironori Suzuki, Echizen (JP); Kazuhiro Wataya, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 183 days.

(21) Appl. No.: 17/502,227

(22) Filed: Oct. 15, 2021

(65) Prior Publication Data

US 2022/0119271 A1 Apr. 21, 2022

(30) Foreign Application Priority Data

Oct. 20, 2020 (JP) .................................. 2020-175721

(51) Int. Cl.
*C01F 17/247* (2020.01)

(52) U.S. Cl.
CPC ........ *C01F 17/247* (2020.01); *C01P 2004/03* (2013.01); *C01P 2004/51* (2013.01)

(58) Field of Classification Search
CPC ....................................................... C01F 7/247
See application file for complete search history.

(56) References Cited

FOREIGN PATENT DOCUMENTS

JP 2000-239019 A 9/2000

*Primary Examiner* — James A Fiorito
(74) *Attorney, Agent, or Firm* — WHDA, LLP

(57) ABSTRACT

An aqueous solution containing ions of one or more rare earth elements selected from the group consisting of Y, Nd, Gd, Tb, Dy, Ho, Er, Tm, Yb, and Lu, hydrogen peroxide, urea, and polyvinylpyrrolidone is heated at a temperature of 80° C. or higher and equal to or lower than a boiling point of the aqueous solution to produce particles of a rare earth compound under a reaction between a hydrolysis product of urea and the ions of the rare earth elements. Furthermore, the particles of the rare earth compound are solid-liquid separated from the aqueous solution, and the obtained solid content is baked at a temperature of 600° C. or higher in an atmosphere containing oxygen to produce rare earth oxide particles.

6 Claims, 8 Drawing Sheets

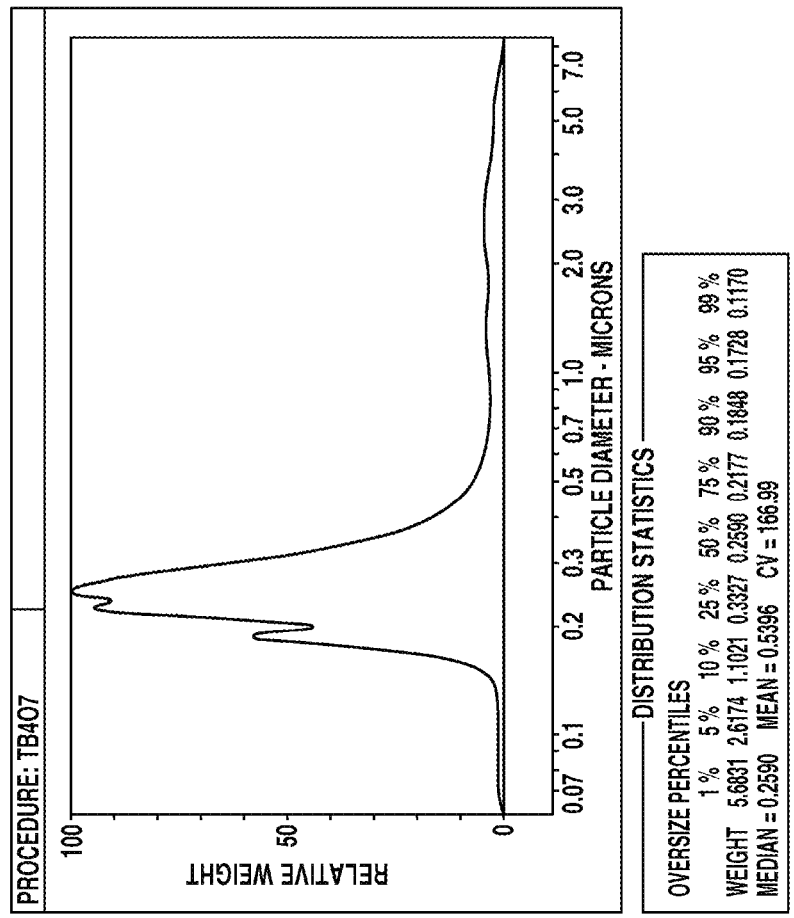

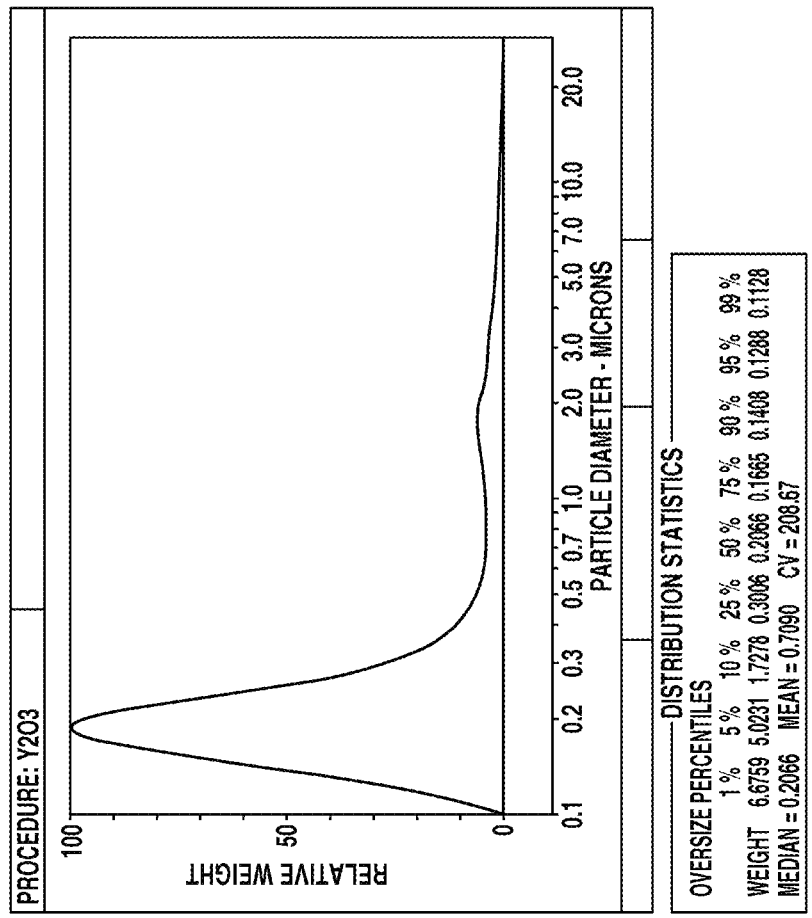

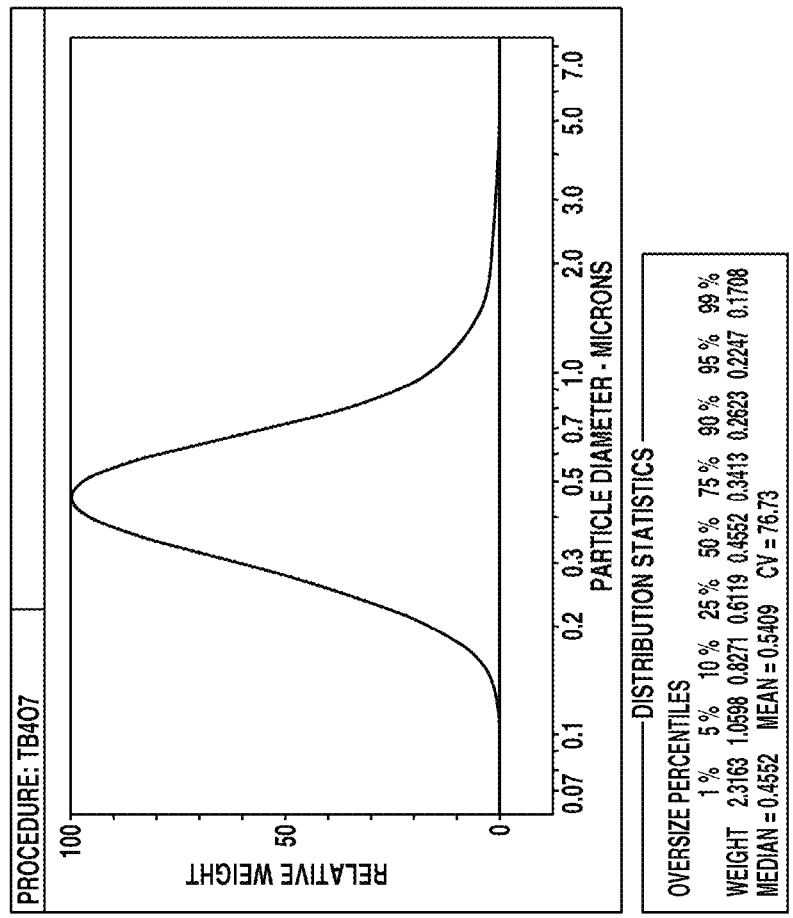

RARE EARTH COMPOUND PARTICLES AND METHOD FOR PRODUCING RARE EARTH OXIDE PARTICLES

CROSS-REFERENCE TO RELATED APPLICATION

This non-provisional application claims priority under 35 U.S.C. § 119(a) on Patent Application No. 2020-175721 filed in Japan on Oct. 20, 2020, the entire contents of which are hereby incorporated by reference.

TECHNICAL FIELD

The present invention relates to rare earth compound particles and a method for producing rare earth oxide particles, which are useful as raw materials and additives for ceramics.

BACKGROUND ART

Rare earth elements are often used as additives in various ceramic products and electronic components, and contribute to high characteristics of these product groups. The rare earth elements used in these products are often used as powder raw materials for compounds, particularly oxides. In recent years, as electronic components and functional ceramics are downsized, ceramic raw materials of smaller particles are increasingly used. Therefore, microparticulation of rare earth compounds such as rare earth oxides is also desired.

Examples of a method for obtaining a rare earth carbonate or rare earth oxide of fine particles include a method described in JP-A 2000-239019 (Patent Document 1). In this method, urea is hydrolyzed by heating in water in the presence of hydrogen peroxide to precipitate a basic carbonate of a rare earth element as monodisperse particles from rare earth element ions. This is solid-liquid separated, dried, and baked to obtain a rare earth oxide.

However, if a rare earth compound is precipitated by this method, the aggregation of the precipitated particles is apt to occur as the concentration of the rare earth element ions in the precipitation system increases. The aggregation of the particles does not sharply increase if the concentration of the rare earth element ions exceeds a certain concentration, but gradually increases as the concentration increases. If such aggregated particles are used as a ceramic material such as an electronic component, the number of such aggregated particles is preferably as small as possible because the aggregated particles cause defects such as abnormal grain growth of crystal grains and abnormalities of a microstructure.

CITATION LIST

Patent Document 1: JP-A 2000-239019

SUMMARY OF THE INVENTION

The present invention has been made in view of the above circumstances, and an object of the present invention is to provide a method for producing particles having fewer aggregated particles as particles of a rare earth compound such as a rare earth oxide, particularly a method having high productivity and being advantageous for mass production as a method for producing such particles.

In a homogeneous precipitation method, particles of a rare earth compound such as a basic carbonate of a rare earth element can be precipitated by heating an aqueous solution containing a rare earth mineral acid salt which is an ion source of a rare earth element, hydrogen peroxide, and urea. In order to solve the above problems, the present inventors have intensively studied on the production of the rare earth compound particles by the homogeneous precipitation method. As a result, the present inventors have found that the aggregation state of the precipitated particles is improved by adding polyvinylpyrrolidone which is a water-soluble polymer to the aqueous solution, followed by heating, whereby the rare earth compound particles such as rare earth oxide particles in which the number of the aggregated particles is extremely small can be produced, and have completed the present invention.

Therefore, the present invention provides the following rare earth compound particles and the following method for producing rare earth oxide particles.

1. A method for producing particles of a rare earth compound including the step of heating an aqueous solution containing ions of one or more rare earth elements selected from the group consisting of Y, Nd, Gd, Tb, Dy, Ho, Er, Tm, Yb, and Lu, hydrogen peroxide, and urea at a temperature of 80° C. or higher and equal to or lower than a boiling point of the aqueous solution to prepare the particles of the rare earth compound under a reaction between a hydrolysis product of urea and the ions of the rare earth elements, wherein the aqueous solution further contains polyvinylpyrrolidone.
2. The production method according to 1, wherein the rare earth compound is a basic carbonate of a rare earth element.
3. A method for producing rare earth oxide particles, wherein particles of a rare earth compound prepared in the step of the method according to 1 or 2 are solid-liquid separated from the aqueous solution, and the obtained solid content is baked at a temperature of 600° C. or higher in an atmosphere containing oxygen.
4. The production method according to 3, wherein rare earth oxide particles having a volume-based particle size distribution median diameter (D50) of 0.05 µm or more and 0.3 µm or less measured by a centrifugal sedimentation method are produced.

Advantageous Effects of the Invention

According to the present invention, even if the concentration of the rare earth ions in the aqueous solution for precipitating the rare earth compound particles is high, particles having fewer aggregated particles than those obtained by a conventional method are obtained. Therefore, even if the concentration of the rare earth ions contained in the aqueous solution is increased as compared with the conventional case, rare earth compound particles such as rare earth oxide particles in which the amount of aggregated particles is equal to or smaller than that in the conventional case can be produced with high productivity. As a result, particles having high characteristics, particularly fine particles having high dispersibility, which can cope with the recent microparticulation of ceramic raw materials, can be mass-produced at low cost.

BRIEF DESCRIPTION OF THE DRAWINGS

FIG. 1A shows an electron micrograph of terbium basic carbonate particles, and FIG. 1B shows an electron micrograph of terbium oxide particles;

FIG. 2A shows an electron micrograph of dysprosium basic carbonate particles, and FIG. 2B shows an electron micrograph of dysprosium oxide particles;

FIG. 3A shows an electron micrograph of yttrium basic carbonate particles, and FIG. 3B shows an electron micrograph of yttrium oxide particles;

FIG. 4A shows an electron micrograph of terbium basic carbonate particles, and FIG. 4B shows an electron micrograph of terbium oxide particles;

FIG. 5 shows the results of particle size distribution measurement of the terbium oxide particles obtained in Example 1 by a centrifugal sedimentation method;

FIG. 7 shows the results of particle size distribution measurement of the yttrium oxide particles obtained in Example 3 by a centrifugal sedimentation method; and FIG. 8 shows the results of particle size distribution measurement of the terbium oxide particles obtained in Comparative Example 1 by a centrifugal sedimentation method.

DESCRIPTION OF THE PREFERRED EMBODIMENT

Figure 1A:
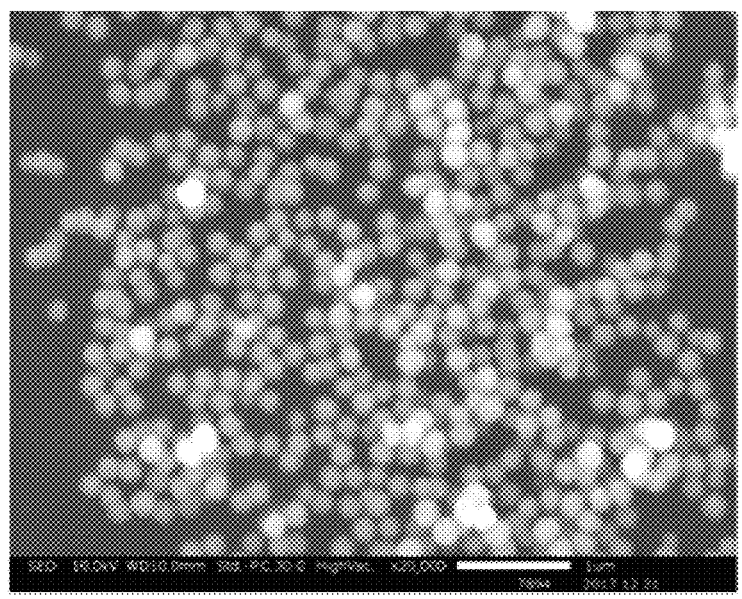
FIGS. 1A and 1B shows electron microscope images of rare earth compound particles obtained in Example 1, where

Hereinafter, the present invention is described in more detail.

In the present invention, particles of a rare earth compound (fine particles) are produced by heating an aqueous solution containing ions of rare earth elements, hydrogen peroxide, and urea to react a hydrolysis product of urea with the ions of the rare earth elements, thereby preparing the rare earth compound. In this case, an aqueous solution containing the ions of the rare earth elements can be prepared by preparing an aqueous solution of a water-soluble rare earth mineral acid salt such as a nitrate or a chloride. In particular, if a metal such as iron or SUS is used for a portion with which the aqueous solution comes into contact in a production facility, it is more preferable to use a nitrate which is less likely to increase impurities derived from the metal of the contact portion in a product.

The ions of the rare earth elements preferably include ions of one or more rare earth elements (first rare earth elements) selected from the group consisting of Y, Nd, Gd, Tb, Dy, Ho, Er, Tm, Yb, and Lu. The concentration of the ions of the rare earth elements in the aqueous solution is preferably 0.01 mol/L or more, particularly 0.03 mol/L or more and preferably 0.08 mol/L, or less, particularly 0.06 mol/L or less. From the viewpoint of the productivity of the particles, the concentration of the ions of the rare earth elements is preferably higher, but at a concentration exceeding 0.08 mol/L, an effect of reducing the aggregation of the particles by polyvinylpyrrolidone to be described later may not be sufficiently obtained.

The aqueous solution containing the ions of the rare earth elements may further contain ions of rare earth elements other than these 10 first rare earth elements, for example, ions of one or more rare earth elements (second rare earth elements) selected from the group consisting of Ce, Pr, Sm, and Eu, in addition to the ions of the first rare earth elements. In this case, as described above, the total concentration of the ions of the first and second rare earth elements in the aqueous solution is preferably 0.01 mol/L or more, particularly 0.03 mol/L or more and 0.08 mol/L or less, particularly 0.06 mol/L or less. Among these, the content rate of the ions of the second rare earth elements is preferably 20 mol % or less, particularly 10 mol % or less per the total of the ions of the first and second rare earth elements.

The aqueous solution containing the ions of the rare earth elements of the present invention contains hydrogen peroxide. The amount of hydrogen peroxide is preferably 0.01 times or more, particularly 0.1 times or more and 1 time or less, particularly 0.5 times or less in terms of molar ratio per the amount of the ions of the rare earth elements according to the particle size of the particles to be produced. If the amount of hydrogen peroxide is less than the above range, the rare earth compound particles may not be sufficiently small. If the amount of hydrogen peroxide exceeds the above range, the rare earth compound particles become too small, which may cause a reduced recovery amount (yield) of the rare earth compound during solid-liquid separation.

The aqueous solution containing the ions of the rare earth elements of the present invention contains urea. The amount of urea is preferably 5 times or more, particularly 10 times or more and 30 times or less, particularly 20 times or less in terms of molar ratio per the amount of the ions of the rare earth elements. If the amount of urea is less than the above range, it may take too long to prepare the rare earth compound, which may cause a reduced recovery amount (yield) of the rare earth compound. The amount of urea exceeding the above range may be disadvantageous in terms of economic efficiency.

The aqueous solution containing the ions of the rare earth elements of the present invention further contains polyvinylpyrrolidone in addition to the above components. As polyvinylpyrrolidone, commercially available products can be used. Polyvinylpyrrolidone is a water-soluble polymer compound obtained by polymerizing N-vinyl-2-pyrrolidone, and products having different viscosities with a K value as an index due to a difference in polymerization degree are produced and sold. However, polyvinylpyrrolidone used in the present invention is not particularly limited, but for example, polyvinylpyrrolidone having a K value in the range of 30 to 90 is used to provide good results. As polyvinylpyrrolidone, powdery polyvinylpyrrolidone or solution polyvinylpyrrolidone may be used.

The added amount of polyvinylpyrrolidone depends on the concentration of the ions of the rare earth elements to be used and the concentration of hydrogen peroxide, but is usually preferably 100 to 1,000 g per 1,000 L of the aqueous solution containing the ions of the rare earth elements. If the added amount of polyvinylpyrrolidone is less than the above range, the effect of reducing the aggregation of the particles may not be sufficiently obtained. Also, even if the added amount of polyvinylpyrrolidone exceeds the above range, the effect of reducing the aggregation of the particles is provided, but the effect is not so large with respect to an increase in the added amount, whereby the added amount may be disadvantageous in terms of economic efficiency.

Hydrogen peroxide and urea may be mixed with the aqueous solution containing the ions of the rare earth elements before or after the aqueous solution containing each component is heated as described later (during heating (that is, while the temperature increases or after the temperature reaches a predetermined temperature)), but it is preferable to mix hydrogen peroxide before mixing urea. Meanwhile, polyvinylpyrrolidone may be mixed before or after heating the aqueous solution containing each component. Even if polyvinylpyrrolidone is mixed in the middle of the reaction between the ions of the rare earth elements and urea, a certain degree of effect is provided, but it is more preferable to mix polyvinylpyrrolidone before heating the aqueous solution containing each component.

In the method for producing a rare earth compound of the present invention, an aqueous solution (mixed aqueous solution) containing each component is heated to hydrolyze urea, and a hydrolysis product such as carbonate ions or ammonium ions generated by hydrolysis is reacted with ions of rare earth elements to generate a precipitate of a rare earth compound. A heating temperature is preferably 80° C. or higher, particularly preferably 90° C. or higher, and preferably equal to or lower than the boiling point of the mixed aqueous solution, particularly lower than the boiling point. For example, the heating temperature is more preferably 100° C. or lower. A heating time may be shortened as the added amount of urea is larger or the heating temperature is higher, but it is usually 30 to 200 minutes.

The prepared precipitate (solid content) is in the form of a slurry with low settleability, but can be solid-liquid separated by sedimentation separation such as filtration, decantation, or centrifugation. Since the obtained precipitate is composed of very small particles, there is a high possibility that the particles pass through the filter in normal filtration, whereby the solid-liquid separation is preferably performed by a centrifugal sedimentation method. In the case of removing unreacted urea and residual anions and the like contained in the solid content, the solid content obtained after the solid-liquid separation may be washed with pure water or the like. The solid content can be further dried in an atmosphere containing oxygen such as air or an inert gas atmosphere as necessary. The particles of the rare earth compound thus obtained include a carbonate, a basic carbonate, and a hydroxide depending on the kinds of the rare earth elements.

The rare earth compound particles (fine particles) obtained as the solid content can be used as they are, but can also be baked to form rare earth oxide particles (fine particles). If the rare earth compound recovered as the solid content after the solid-liquid separation is baked as it is, the rare earth compound is aggregated and sintered in a massive form in many cases. Therefore, in order to recover the rare earth oxide obtained after baking as particles having good dispersibility, it is preferable to dry and bake the rare earth oxide after the solid-liquid separation. A drying temperature is preferably 150° C. or lower, particularly 80° C. or lower, above all 60° C. or lower. If the drying temperature is too high, the recrystallization of the rare earth compound occurs depending on the kinds of the rare earth elements, which may cause impaired properties of the particles. A drying time is preferably 1 day (24 hours) or more, and is not particularly limited, but is usually preferably 7 days (168 hours) or less. A drying atmosphere is not particularly limited, and may be an atmosphere containing oxygen such as air or an inert gas atmosphere.

The dried rare earth compound can be crushed by using a crusher or the like. In the dried rare earth compound, the particles are considered to be bonded to each other by a very weak force such as a hydrogen bond, whereby the particles are easily separated with a relatively weak force. As the crusher, a jet mill, a roll mill, a hammer mill, a bead mill, and a ball mill and the like can be used, and the crusher may be appropriately selected according to the state of particles to be obtained by crushing.

Baking for obtaining the rare earth oxide is preferably carried out at a temperature of 600° C. or higher, particularly 750° C. or higher, and 1,000° C. or lower, particularly 900° C. or lower in an atmosphere containing oxygen such as air or oxygen gas. A baking time is preferably 2 hours or more and usually 8 hours or less.

The production method of the present invention can provide rare earth compound particles such as rare earth oxide particles having a uniform particle size of 0.05 μm or more, particularly 0.1 μm or more and 1 μm or less, particularly 0.5 μm or less, above all 0.3 μm or less by SEM observation. The production method of the present invention can provide rare earth compound particles such as rare earth oxide particles having a volume-based particle size distribution median diameter (D50) of 0.05 μm or more and 0.3 μm or less as measured by a centrifugal sedimentation method.

EXAMPLES

Hereinafter, the present invention is specifically described with reference to Examples and Comparative Examples, but the present invention is not limited to the following Examples.

Example 1

500 g of polyvinylpyrrolidone (K value: 90) was added to 1,000 L of an aqueous terbium nitrate solution having a terbium ion concentration of 0.045 mol/L, followed by sufficiently stirring for dissolution. Next, this aqueous solution was heated to 98° C., and hydrogen peroxide water was then added to the aqueous solution so that the hydrogen peroxide concentration was 0.01 mol/L. Furthermore, urea was added to the aqueous solution so that the urea concentration was 0.65 mol/L.

If the aqueous solution was heated at 98° C. for 75 minutes, a solid was precipitated.

Next, the precipitate was solid-liquid separated by a centrifuge, and the recovered solid content was then washed with about 50 L of pure water. The obtained solid content was observed with an electron microscope, and the solid content was confirmed to be composed of particles having a particle diameter of about 0.1 to 0.3 μm with very little aggregation of particles although some of the particles were connected to each other. An electron microscope image of the particles is shown in FIG. 1A. It was confirmed by X-ray diffraction that the particles are amorphous, and by elemental analysis that the particles have a composition corresponding to a basic carbonate of terbium.

Figure 1B:
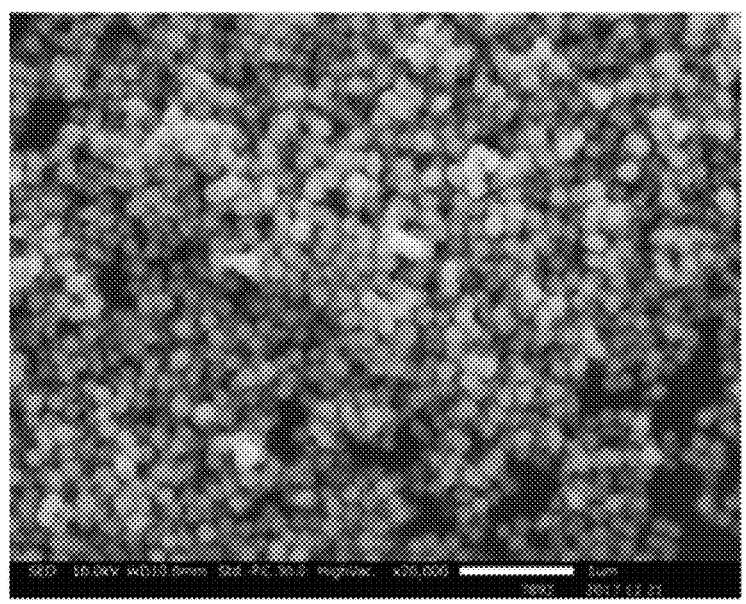

Next, the obtained terbium basic carbonate particles were baked in the air at 850° C. for 4 hours. The obtained baked product was observed with an electron microscope, and the baked product was confirmed to be composed of particles having a uniform particle diameter of about 0.1 to 0.2 μm with very little aggregation of particles although some of the particles were connected to each other. An electron microscope image of the particles is shown in FIG. 1B. It was confirmed by X-ray diffraction that the particles are composed of terbium oxide. Furthermore, the obtained particles were dispersed in pure water by using a homogenizer (40 W, 1 min), and the particle size distribution was then measured by a centrifugal sedimentation method using a disc centrifugal particle size distribution analyzer (DC18000 manufactured by Nihon Rufuto Co., Ltd.). The results are shown in FIG. 5. The volume-based median diameter (D50) was 0.26 μm.

Example 2

650 g of polyvinylpyrrolidone (K value: 90) was added to 1,000 L of an aqueous dysprosium nitrate solution having a dysprosium ion concentration of 0.045 mol/L, followed by sufficiently stirring for dissolution. Next, this aqueous solution was heated to 98° C., and hydrogen peroxide water was then added to the aqueous solution so that the hydrogen peroxide concentration was 0.01 mol/L. Furthermore, urea was added to the aqueous solution so that the urea concentration was 0.65 mol/L. If the aqueous solution was heated at 98° C. for 90 minutes, a solid was precipitated.

Figure 2A:
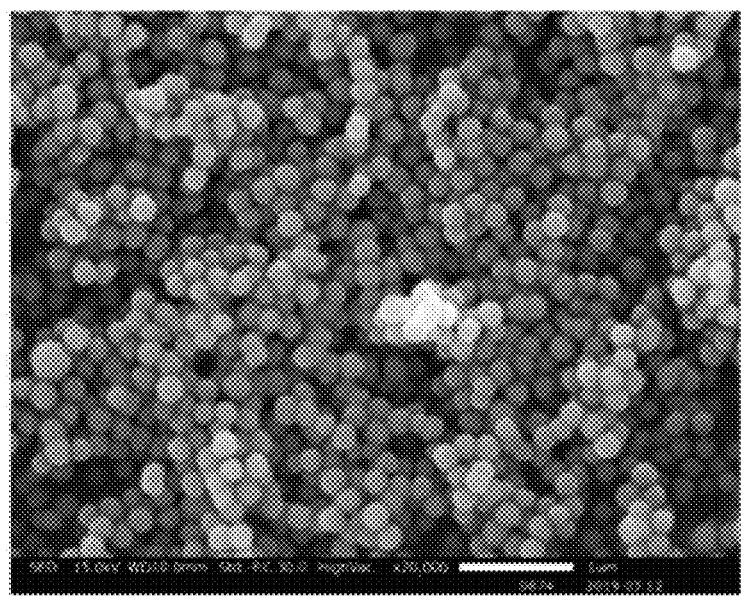
FIGS. 2A and 2B shows electron microscope images of rare earth compound particles obtained in Example 2, where

Next, the precipitate was solid-liquid separated by a centrifuge, and the recovered solid content was then washed with about 50 L of pure water. The obtained solid content was observed with an electron microscope, and the solid content was confirmed to be composed of particles having a particle diameter of about 0.1 to 0.3 μm with very little aggregation of particles although some of the particles were connected to each other. An electron microscope image of the particles is shown in FIG. 2A. It was confirmed by X-ray diffraction that the particles are amorphous, and by elemental analysis that the particles have a composition corresponding to a basic carbonate of dysprosium.

Figure 2B:
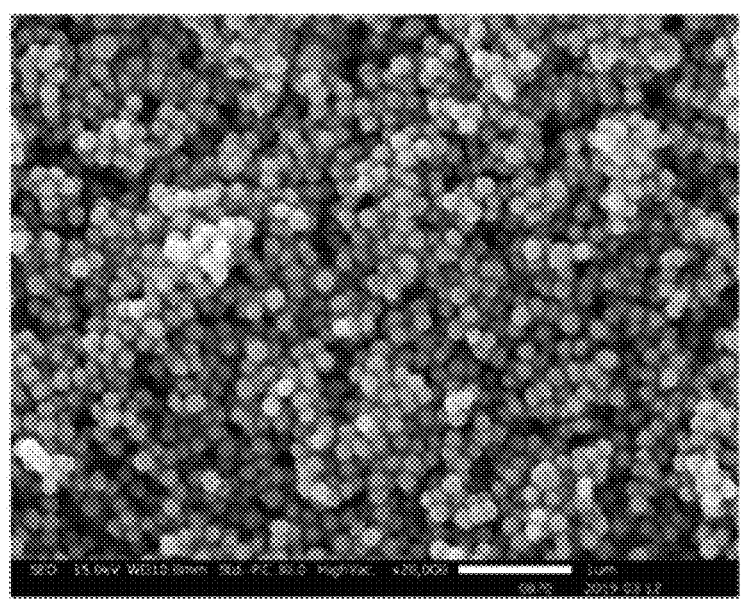
Figure 6:
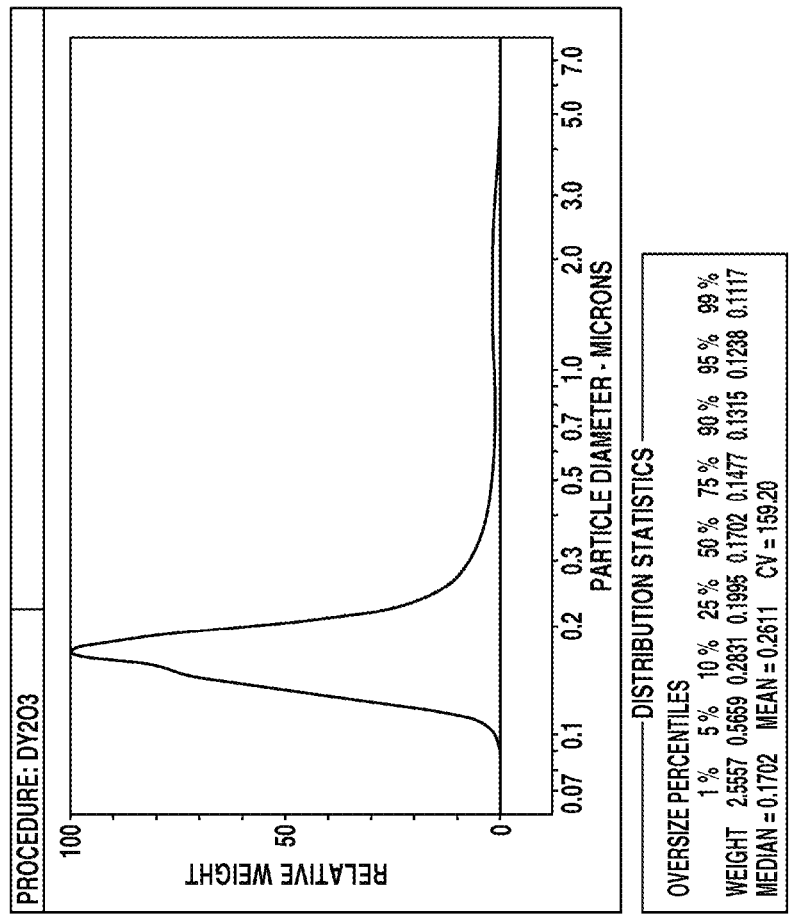
FIG. 6 shows the results of particle size distribution measurement of the dysprosium oxide particles obtained in Example 2 by a centrifugal sedimentation method.

Next, the obtained dysprosium basic carbonate particles were baked in the air at 850° C. for 4 hours. The obtained baked product was observed with an electron microscope, and the baked product was confirmed to be composed of particles having a uniform particle diameter of about 0.1 to 0.2 μm with very little aggregation of particles although some of the particles were connected to each other. An electron microscope image of the particles is shown in FIG. 2B. It was confirmed by X-ray diffraction that the particles are composed of dysprosium oxide. Furthermore, the obtained particles were dispersed in pure water by using a homogenizer (40 W, 1 min), and the particle size distribution was then measured by a centrifugal sedimentation method using a disc centrifugal particle size distribution analyzer (DC18000 manufactured by Nihon Rufuto Co., Ltd.). The results are shown in FIG. 6. The volume-based median diameter (D50) was 0.17 μm.

Example 3

500 g of polyvinylpyrrolidone (K value: 90) was added to 1,000 L of an aqueous yttrium nitrate solution having an yttrium ion concentration of 0.035 mol/L, followed by sufficiently stirring for dissolution. Next, this aqueous solution was heated to 98° C., and hydrogen peroxide water was then added to the aqueous solution so that the hydrogen peroxide concentration was 0.01 mol/L. Furthermore, urea was added to the aqueous solution so that the urea concentration was 0.6 mol/L. If the aqueous solution was heated at 98° C. for 90 minutes, a solid was precipitated.

Figure 3A:
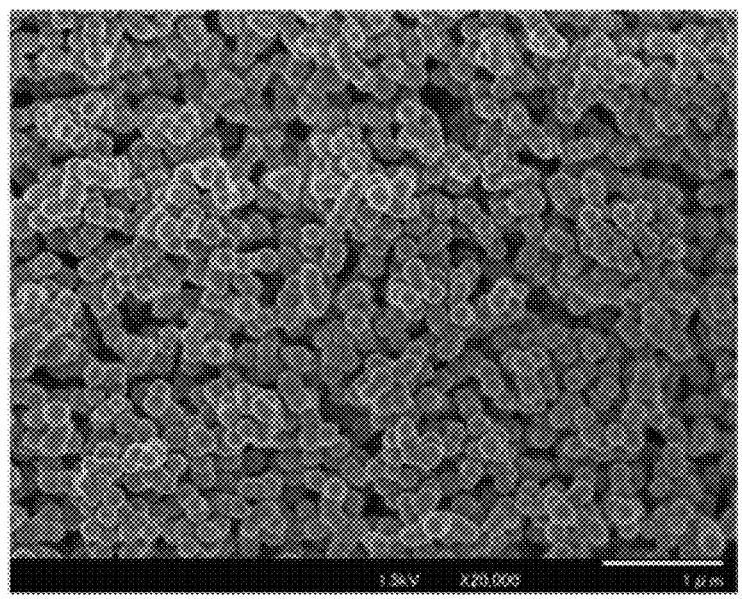
FIGS. 3A and 3B shows electron microscopic images of rare earth compound particles obtained in Example 3, where

Next, the precipitate was solid-liquid separated by a centrifuge, and the recovered solid content was then washed with about 50 L of pure water. The obtained solid content was observed with an electron microscope, and the solid content was confirmed to be composed of particles having a particle diameter of about 0.1 to 0.3 μm with very little aggregation of particles although some of the particles were connected to each other. An electron microscope image of the particles is shown in FIG. 3A. It was confirmed by X-ray diffraction that the particles are amorphous, and by elemental analysis that the particles have a composition corresponding to a basic carbonate of yttrium.

Figure 3B:
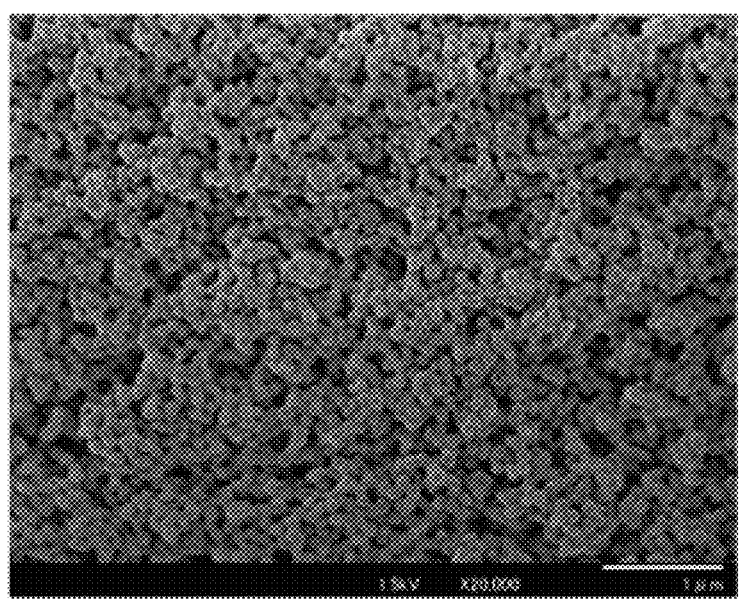

Next, the obtained yttrium basic carbonate particles were baked in the air at 850° C. for 4 hours. The obtained baked product was observed with an electron microscope, and the baked product was confirmed to be composed of particles having a uniform particle diameter of about 0.1 to 0.2 μm with very little aggregation of particles although some of the particles were connected to each other. An electron microscope image of the particles is shown in FIG. 3B. It was confirmed by X-ray diffraction that the particles are composed of yttrium oxide. Furthermore, the obtained particles were dispersed in pure water by using a homogenizer (40 W, 1 min), and the particle size distribution was then measured by a centrifugal sedimentation method using a disc centrifugal particle size distribution analyzer (DC18000 manufactured by Nihon Rufuto Co., Ltd.). The results are shown in FIG. 7. The volume-based median diameter (D50) was 0.21 μm.

Comparative Example 1

1,000 L of an aqueous terbium nitrate solution having a terbium ion concentration of 0.045 mol/L was prepared. Next, this aqueous solution was heated to 98° C., and hydrogen peroxide water was then added to the aqueous solution so that the hydrogen peroxide concentration was 0.01 mol/L. Furthermore, urea was added to the aqueous solution so that the urea concentration was 0.65 mol/L.

If the aqueous solution was heated at 98° C. for 75 minutes, a solid was precipitated.

Figure 4A:
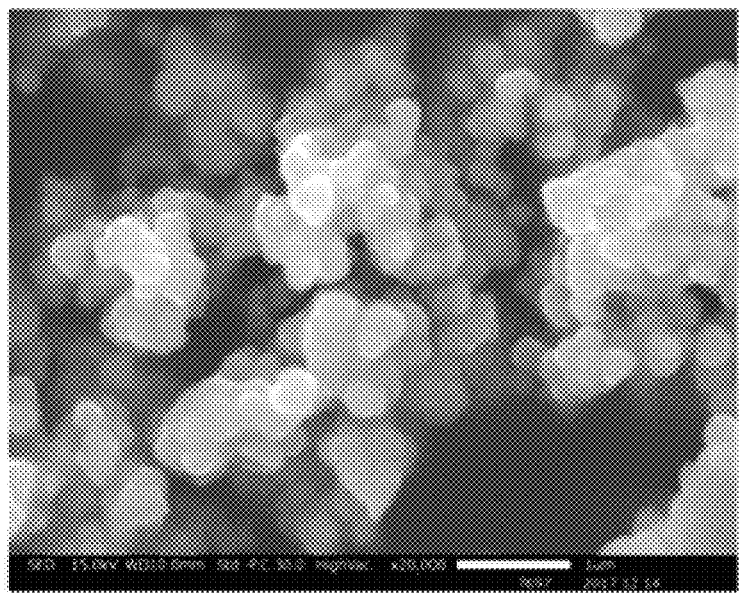
FIGS. 4A and 4B shows electron microscope images of rare earth compound particles obtained in Comparative Example 1, where

Next, the precipitate was solid-liquid separated by a centrifuge, and the recovered solid content was then washed with about 50 L of pure water. If the obtained solid content was observed with an electron microscope, most of the particles were confirmed to be aggregated. An electron microscope image of the particles is shown in FIG. 4A. It was confirmed by X-ray diffraction that the particles are amorphous, and by elemental analysis that the particles have a composition corresponding to a basic carbonate of terbium.

Figure 4B:
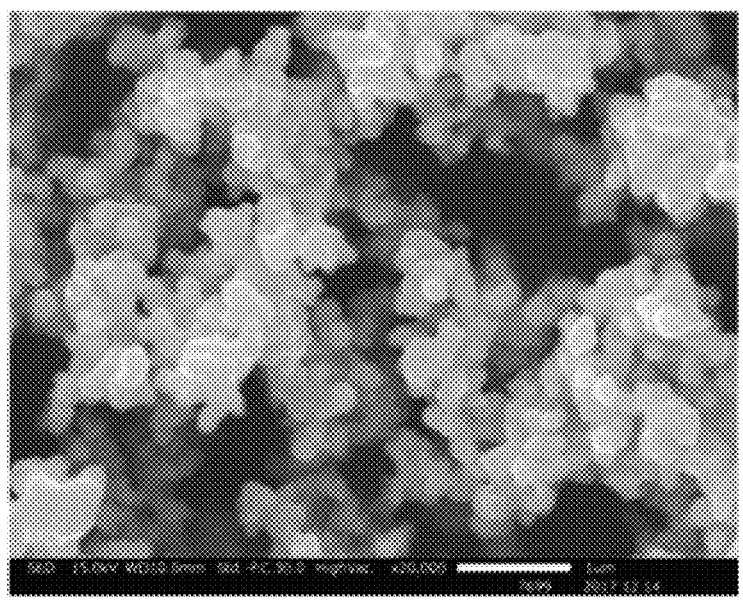

Next, the obtained terbium basic carbonate particles were baked in the air at 850° C. for 4 hours. If the obtained baked product was observed with an electron microscope, most of the particles were confirmed to be aggregated. An electron microscope image of the particles is shown in FIG. 4B. It was confirmed by X-ray diffraction that the particles are composed of terbium oxide. Furthermore, the obtained particles were dispersed in pure water by using a homogenizer (40 W, 1 min), and the particle size distribution was then measured by a centrifugal sedimentation method using a disc centrifugal particle size distribution analyzer (DC18000 manufactured by Nihon Rufuto Co., Ltd.). The results are shown in FIG. 8. The volume-based median diameter (D50) was 0.46 μm.

Japanese Patent Application No. 2020-175721 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for producing particles of a rare earth compound comprising the step of heating an aqueous solution containing ions of one or more rare earth elements selected from the group consisting of Y, Nd, Gd, Tb, Dy, Ho, Er, Tm, Yb, and Lu, hydrogen peroxide, and urea at a temperature of 80° C. or higher and equal to or lower than a boiling point of the aqueous solution to prepare the particles of the rare earth compound under a reaction between a hydrolysis product of urea and the ions of the rare earth elements, wherein the aqueous solution further contains polyvinylpyrrolidone.

2. The production method according to claim 1, wherein the rare earth compound is a basic carbonate of a rare earth element.

3. A method for producing particles of a rare earth compound comprising:

a first step of heating an aqueous solution containing ions of one or more rare earth elements selected from the group consisting of Y, Nd, Gd, Tb, Dy, Ho, Er, Tm, Yb, and Lu, hydrogen peroxide, and urea at a temperature of 80° C. or higher and equal to or lower than a boiling point of the aqueous solution to prepare the particles of the rare earth compound under a reaction between a hydrolysis product of urea and the ions of the rare earth elements, wherein the aqueous solution further contains polyvinylpyrrolidone, a second step of solid-liquid separating the particles of the rare earth compound prepared in the first step to obtain a solid content; and a third step of baking the solid content at a temperature of 600° C. or higher in an atmosphere containing oxygen.

4. The production method according to claim 3, wherein rare earth oxide particles having a volume-based particle size distribution median diameter (D50) of 0.05 μm or more and 0.3 μm or less measured by a centrifugal sedimentation method are produced.

5. A method for producing particles of a rare earth compound comprising:

a first step of heating an aqueous solution containing ions of one or more rare earth elements selected from the group consisting of Y, Nd, Gd, Tb, Dy, Ho, Er, Tm, Yb, and Lu, hydrogen peroxide, and urea at a temperature of 80° C. or higher and equal to or lower than a boiling point of the aqueous solution to prepare the particles of the rare earth compound under a reaction between a hydrolysis product of urea and the ions of the rare earth elements, wherein the aqueous solution further contains polyvinylpyrrolidone, wherein the rare earth compound is a basic carbonate of a rare earth element a second step of solid-liquid separating the particles of the rare earth compound prepared in the first step to obtain a solid content; and a third step of baking the solid content at a temperature of 600° C. or higher in an atmosphere containing oxygen.

6. The production method according to claim 5, wherein rare earth oxide particles having a volume-based particle size distribution median diameter (D50) of 0.05 μm or more and 0.3 μm or less measured by a centrifugal sedimentation method are produced.

\* \* \* \* \*